S. S. Stuntz's Traction Machine.

No. 103102

Patented May 17 1870

Witnesses:
Chas. Nida
S. S. Mabee

Inventor:
S. S. Stuntz
per Munn & Co
Attorneys.

UNITED STATES PATENT OFFICE.

STEPHEN S. STUNTZ, OF JAMESTOWN, NEW YORK.

IMPROVED TRACTION-MACHINE FOR PLOWS.

Specification forming part of Letters Patent No. 103,102, dated May 17, 1870.

*To all whom it may concern:*

Be it known that I, STEPHEN S. STUNTZ, of Jamestown, in the county of Chautauqua and State of New York, have invented a new and useful Improvement in Traction-Machine; and I do hereby declare that the following is a full, clear, and exact description thereof, which will enable others skilled in the art to make and use the same, reference being had to the accompanying drawing, forming part of this specification.

This invention relates to improvements in traction-machines for drawing plows, and for other heavy draft purposes; and consists of a car or truck mounted on an endless traction device composed of broad bars or planks connected to belts or chains, or hinged together, working over pulleys at each end, and carrying rollers or wheels mounted in bearings on the inner faces, on which rails attached to the truck rest and roll along as the truck is propelled in any way, the said wheels supporting the bars of the traction device on the upper side of said rails when in the upper or returning position.

It also consists in the application to each end of the truck of draft-frames with guiding caster-wheels, so attached that the weight of one side, or a portion thereof, may be transferred from the draft device to the guiding-wheels when required to turn either way from a straight line, all as hereinafter more fully specified.

Figure 1:
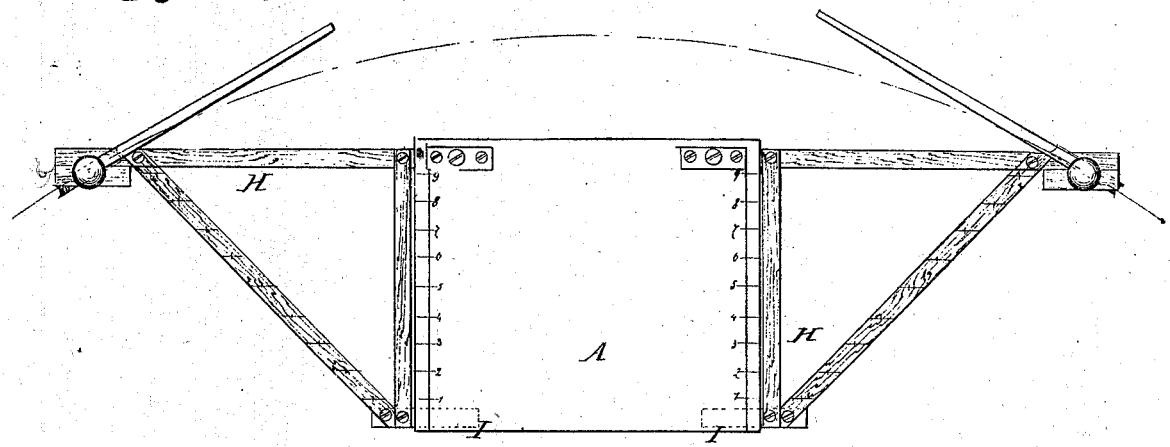
Figure 2:
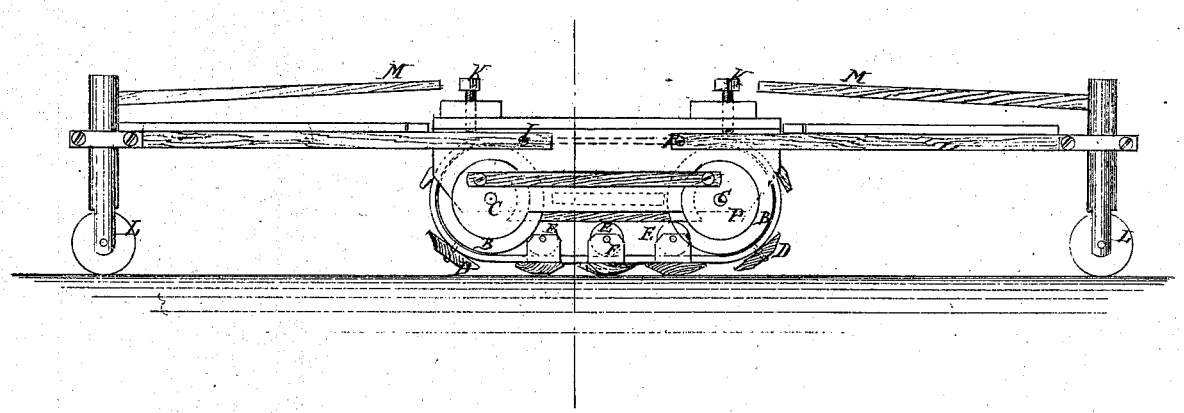
Figure 3:
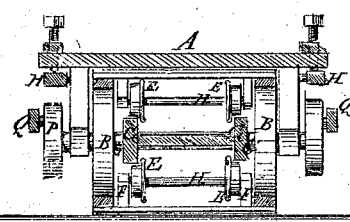

Figure 1 is a plan view of my improved machine. Fig. 2 is a side elevation of the same, and Fig. 3 is a transverse section of the same.

A is the platform, to which is applied at each end a pair of wheels, B, mounted on axles C, and either having smooth circular faces for belts F, or they may have octagonal or other faces for carrying links of chains or the ends of the transverse traction bars or planks D, which, in this instance, are attached at the centers to the belts, and they have wheels E mounted in bearings on the inside of the traction-plank and working around the rails G permanently attached to the truck, each traction-plank having a pair of wheels, one at each end, connected to one axle.

The traction-plank may be beveled at the edges on the sides which work on the ground, or these sides may be made on regular curves to work smoothly in going down and rising up on the ground.

The car is supported on the wheels E at the under side of the rails G by the said rails, and the wheels at the upper side going back to the rear roll along the top of the said rails.

The right-angled triangular traction and guiding frames H are attached to each end of the truck by pivot-points I, and temper-screws K are tapped through the frame at one side against the frame H, so that the latter can be forced down at the outer ends, where they are provided with caster-wheels L to transfer the weight of that side mainly to the caster-wheels, and the shafts of the latter are provided with long levers M, by which to turn them right or left when the weight is transferred for guiding the truck either way.

The diagonal beams or braces of these frames are well suited for the attachment of gangs of plows, so that one will follow another, as is required.

The machine may be drawn by animals or propelled by steam-power mounted on it and applied to the shafts C. For this purpose the said shafts may project beyond supports N, and have cranks or disks P with wrist-pins for the attachment of the connecting-rods of engines and other rods connecting to the two wheels on each side.

Having thus described my invention, I claim as new and desire to secure by Letters Patent—

1. The platform A, wheels B, axle C, belts F, planks D, wheels E, and rails G, all combined, arranged, and relatively constructed as and for the purpose described.

2. The combination, with the traction-machine, constructed substantially as described, of the guiding and traction frames H, the temper-screws, caster-wheels, and the guiding-levers, all substantially as specified.

STEPHEN S. STUNTZ.

Witnesses:
AUSTIN HEATH,
EDWARD LANGFORD.